US012711281B2

(12) United States Patent
Takahashi

(10) Patent No.: US 12,711,281 B2
(45) **Date of Patent: *Aug. 18, 2026**

(54) SECURITY DEVICE WITH PROGRAMMABLE SYSTOLIC-MATRIX CRYPTOGRAPHIC MODULE AND PROGRAMMABLE INPUT/OUTPUT INTERFACE

(71) Applicant: SECTURION SYSTEMS, INC., Centerville, UT (US)

(72) Inventor: Richard J. Takahashi, Layton, UT (US)

(73) Assignee: Secturion Systems, Inc., Centerville, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/419,440

(22) Filed: Jan. 22, 2024

(65) Prior Publication Data

US 2024/0311516 A1 Sep. 19, 2024

Related U.S. Application Data

(63) Continuation of application No. 17/691,986, filed on Mar. 10, 2022, now Pat. No. 11,921,906, which is a (Continued)

(51) Int. Cl.
*G06F 21/60* (2013.01)
*G06F 21/72* (2013.01)
(Continued)

(52) U.S. Cl.
CPC .............. *G06F 21/72* (2013.01); *G06F 21/60* (2013.01); *G06F 21/602* (2013.01); *G06F 21/76* (2013.01); *H04L 63/0485* (2013.01)

(58) Field of Classification Search
CPC .......... G06F 21/72; G06F 21/76; G06F 21/60; G06F 21/602; H04L 63/0485
See application file for complete search history.

(56) References Cited

U.S. PATENT DOCUMENTS 4,319,079 A 3/1982 Best
4,357,529 A 11/1982 Atalia
(Continued)

FOREIGN PATENT DOCUMENTS

EP 2337304 6/2011
EP 2667631 A1 * 11/2013 ......... H04N 21/4408
(Continued)

OTHER PUBLICATIONS

Blum, Thomas et al. Worcester Polytechnic Institute ECE Department. "Montgomery Modular Exponentiation on Reconfigurable Hardware" Apr. 1999. pp. 1-8, 8 pages.
(Continued)

*Primary Examiner* — David J Pearson
(74) *Attorney, Agent, or Firm* — Greenberg Traurig LLP

(57) ABSTRACT

A system includes programmable systolic cryptographic modules for security processing of packets from a data source. A first programmable input/output interface routes each incoming packet to one of the systolic cryptographic modules for encryption processing. A second programmable input/output interface routes the encrypted packets from the one systolic cryptographic module to a common data storage. In one embodiment, the first programmable input/output interface is coupled to an interchangeable physical interface that receives the incoming packets from the data source. In another embodiment, each cryptographic module includes a programmable systolic packet input engine, a programmable cryptographic engine, and a programmable
(Continued)

systolic packet output engine, each configured as a systolic array (e.g., using FPGAs) for data processing.

20 Claims, 8 Drawing Sheets

Related U.S. Application Data continuation of application No. 15/983,982, filed on May 18, 2018, now Pat. No. 11,288,402, which is a continuation of application No. 15/072,730, filed on Mar. 17, 2016, now Pat. No. 10,013,580, which is a continuation of application No. 14/177,392, filed on Feb. 11, 2014, now Pat. No. 9,317,718.

(60) Provisional application No. 61/806,676, filed on Mar. 29, 2013.

(51) Int. Cl.
*G06F 21/76* (2013.01)
*H04L 9/40* (2022.01)

(56) References Cited

U.S. PATENT DOCUMENTS 5,351,299 A 9/1994 Matsuzaki et al.
5,594,797 A 1/1997 Alan ar a et al.
5,602,916 A 2/1997 Grube
5,631,960 A 5/1997 Likens et al.
5,892,962 A 4/1999 Cloutier
5,915,025 A 6/1999 Taguchi et al.
5,961,626 A 10/1999 Harrison et al.
5,995,628 A 11/1999 Kitaj et al.
6,044,388 A 3/2000 DeBellis et al.
6,081,895 A 6/2000 Harrison et al.
6,101,255 A 8/2000 Harrison et al.
6,128,666 A 10/2000 Muller et al.
6,157,955 A 12/2000 Narad
6,275,588 B1 8/2001 Videcrantz et al.
6,304,973 B1 10/2001 Williams
6,351,813 B1 2/2002 Mooney
6,378,072 B1 4/2002 Collins
6,515,993 B1 2/2003 Williams et al.
6,550,012 B1 4/2003 Villa et al.
6,567,913 B1 5/2003 Ryan, Jr.
6,577,734 B1 6/2003 Etzel et al.
6,598,161 B1 7/2003 Kluttz et al.
6,715,028 B1 3/2004 Toda
6,845,446 B1 1/2005 Fuller
6,983,366 B1 1/2006 Huynh
7,171,000 B1 1/2007 Toh et al.
7,200,756 B2 4/2007 Griffin et al.
7,277,941 B2 10/2007 Ignatius et al.
7,370,348 B1 5/2008 Patel
7,382,787 B1 6/2008 Barnes et al.
7,421,576 B1 9/2008 Kent
7,496,764 B2 2/2009 Robert
7,594,262 B2 9/2009 Hanzlik et al.
7,607,167 B1 10/2009 Johnson et al.
7,639,696 B2 12/2009 Wu
7,644,268 B2 1/2010 Filipi-Martin et al.
7,716,467 B1 5/2010 Deffet et al.
7,734,844 B2 6/2010 Pedersen et al.
7,773,754 B2 8/2010 Buer et al.
7,792,300 B1 9/2010 Caronni
7,804,504 B1 9/2010 Agarwal
7,814,316 B1 10/2010 Hughes et al.
7,836,490 B2 11/2010 Smith
7,849,306 B2 12/2010 Takeshima et al.
RE42,212 E 3/2011 Hoffman
7,908,472 B2 3/2011 Freed et al.
7,920,701 B1 4/2011 Cox et al.
7,921,284 B1 4/2011 Kinghorn et al.
7,921,288 B1 4/2011 Hildebrand
7,929,701 B1 4/2011 Sprunk
7,930,540 B2 4/2011 Ahuja et al.
7,930,756 B1 4/2011 Crocker et al.
7,958,351 B2 6/2011 Luthl
7,996,670 B1 8/2011 Krishna et al.
8,065,713 B1 11/2011 Vainstein et al.
8,073,949 B2 12/2011 Cunchon et al.
8,166,289 B2 4/2012 Owens et al.
8,219,799 B1 7/2012 Lucchesi
8,229,116 B2 7/2012 Ogata
8,230,207 B2 7/2012 Iyer et al.
8,234,686 B2 7/2012 Alvermann et al.
8,266,433 B1 9/2012 Przykucki et al.
8,266,670 B1 9/2012 Merkow et al.
8,275,984 B2 9/2012 Loveless
8,289,975 B2 10/2012 Suganthi et al.
8,307,206 B2 11/2012 Ahuja et al.
8,356,177 B2 1/2013 McGrew et al.
8,386,768 B2 2/2013 Nair et al.
8,407,194 B1 3/2013 Chaput et al.
8,416,954 B1 4/2013 Raizen et al.
8,418,252 B2 4/2013 Akyol et al.
8,433,783 B2 4/2013 Jackowski et al.
8,433,929 B2 4/2013 Yamashita
8,438,626 B2 5/2013 Anderson et al.
8,443,069 B2 5/2013 Bagepalli et al.
8,452,956 B1 5/2013 Kersey
8,478,997 B2 7/2013 Lapp
8,479,304 B1 7/2013 Clifford
8,533,494 B2 9/2013 Harada
8,536,957 B1 9/2013 Nakamura et al.
8,539,571 B2 9/2013 Smith
8,561,127 B1 10/2013 Agrawal et al.
8,590,057 B1 11/2013 Mayblum et al.
8,594,335 B1 11/2013 Izhar et al.
8,595,814 B2 11/2013 Le et al.
8,631,460 B2 1/2014 Shea et al.
8,681,974 B1 3/2014 Langhammer
8,707,020 B1 4/2014 Lengyel et al.
8,751,826 B2 6/2014 O'Connor et al.
8,811,620 B2 8/2014 Chaves et al.
8,813,247 B1 8/2014 Alten
8,909,942 B1 12/2014 Obukhov et al.
8,935,523 B1 1/2015 Osburn, III
8,966,249 B2 2/2015 Lindteigen
8,966,288 B2 2/2015 Ignatius et al.
8,988,713 B2 3/2015 Gutnik et al.
9,088,538 B2 7/2015 Lindteigen et al.
9,100,361 B1 8/2015 Lucchesi et al.
9,191,200 B1 11/2015 Adams et al.
9,227,139 B2 1/2016 Mamtani et al.
9,230,112 B1 * 1/2016 Peterson ................ G06F 21/76
9,245,148 B2 1/2016 Runkis et al.
9,305,185 B1 * 4/2016 Pedersen .............. G06F 21/575
9,306,917 B2 4/2016 Brugger et al.
9,317,705 B2 4/2016 O'Hare et al.
9,317,718 B1 4/2016 Takahashi
9,355,279 B1 5/2016 Takahashi
9,374,344 B1 6/2016 Takahashi
9,374,345 B2 6/2016 Brugger et al.
9,378,359 B2 6/2016 Qureshi et al.
9,380,048 B2 6/2016 Lindteigen et al.
9,524,399 B1 12/2016 Takahashi
9,536,103 B2 1/2017 Redberg
9,560,019 B2 1/2017 Barney
9,660,964 B2 5/2017 Asiedu
9,680,801 B1 6/2017 Martini
9,690,598 B2 6/2017 Lindteigen
9,692,605 B2 6/2017 Lindteigen et al.
9,705,854 B2 7/2017 Khazan
9,794,064 B2 10/2017 Takahashi
9,794,270 B2 10/2017 Lindteigen
9,798,899 B1 10/2017 Takahashi
9,858,442 B1 1/2018 Takahashi
9,871,662 B2 1/2018 Glisson
9,916,456 B2 3/2018 O'Hare et al.
10,013,580 B2 7/2018 Takahashi
10,114,766 B2 10/2018 Takahashi

(56) References Cited

U.S. PATENT DOCUMENTS 10,708,236 B2 7/2020 Takahashi
10,902,155 B2 1/2021 Takahashi
11,063,914 B1 7/2021 Takahashi
11,283,774 B2 3/2022 Anderson et al.
11,288,402 B2 * 3/2022 Takahashi ............... G06F 21/76
11,429,540 B2 8/2022 Takahashi
11,783,089 B2 10/2023 Takahashi
11,792,169 B2 10/2023 Anderson et al.
11,921,906 B2 * 3/2024 Takahashi ............... G06F 21/72
2001/0042124 A1 11/2001 Barron
2002/0025045 A1 2/2002 Raike
2002/0027906 A1 3/2002 Athreya
2002/0029280 A1 3/2002 Holden
2002/0083317 A1 6/2002 Ohta
2002/0091975 A1 7/2002 Redlich et al.
2002/0099959 A1 7/2002 Redlich et al.
2002/0104020 A1 8/2002 Strahm
2002/0162024 A1 10/2002 Cunchon
2002/0165961 A1 11/2002 Everdell et al.
2003/0012373 A1 1/2003 Ogura et al.
2003/0014627 A1 * 1/2003 Krishna .................. G06F 21/72 713/153
2003/0023846 A1 1/2003 Krishna
2003/0051054 A1 3/2003 Redlich et al.
2003/0070077 A1 4/2003 Redlich et al.
2003/0074552 A1 4/2003 Olkin et al.
2003/0076959 A1 4/2003 Chui
2003/0119484 A1 6/2003 Adachi et al.
2003/0120949 A1 6/2003 Redlich et al.
2003/0172279 A1 9/2003 Yudasaka
2003/0182435 A1 9/2003 Redlich et al.
2003/0196108 A1 10/2003 Kung
2003/0210702 A1 11/2003 Kendall
2004/0034772 A1 2/2004 Alao
2004/0054914 A1 3/2004 Sullivan
2004/0083286 A1 4/2004 Holden
2004/0114558 A1 6/2004 Krishnamurthi et al.
2004/0123096 A1 6/2004 Buer
2004/0123119 A1 6/2004 Buer
2004/0123120 A1 6/2004 Buer
2004/0123121 A1 6/2004 Paaske
2004/0123123 A1 6/2004 Buer
2004/0139313 A1 7/2004 Buer
2004/0143734 A1 7/2004 Buer
2004/0148500 A1 7/2004 Olkin et al.
2004/0151323 A1 8/2004 Olkin et al.
2004/0153642 A1 8/2004 Plotkin et al.
2004/0196979 A1 10/2004 Cheng et al.
2004/0250082 A1 12/2004 Li
2005/0010690 A1 * 1/2005 Marshall ................... H04L 9/40 709/246
2005/0097357 A1 5/2005 Smith
2005/0132070 A1 6/2005 Redlich et al.
2005/0138109 A1 6/2005 Redlich et al.
2005/0138110 A1 6/2005 Redlich et al.
2005/0138654 A1 6/2005 Minne
2005/0166066 A1 7/2005 Ahuja et al.
2005/0190758 A1 9/2005 Gai et al.
2005/0198412 A1 9/2005 Pedersen et al.
2005/0198498 A1 9/2005 Gaur
2005/0198500 A1 9/2005 Gaur
2005/0216413 A1 9/2005 Murakami et al.
2005/0257062 A1 11/2005 Ignatius et al.
2006/0015748 A1 1/2006 Goto
2006/0059537 A1 3/2006 Alvermann et al.
2006/0059553 A1 3/2006 Morais
2006/0062394 A1 3/2006 Kamijo
2006/0117126 A1 6/2006 Leung et al.
2006/0129810 A1 6/2006 Jeong
2006/0133604 A1 6/2006 Buer et al.
2006/0140410 A1 6/2006 Aihara
2006/0149965 A1 7/2006 Sharma
2006/0174102 A1 8/2006 Smith et al.
2006/0174112 A1 8/2006 Wray
2007/0067630 A1 3/2007 Lenkov et al.
2007/0067634 A1 3/2007 Siegler
2007/0074020 A1 3/2007 Nishimura
2007/0076599 A1 4/2007 Ayyagari
2007/0109124 A1 5/2007 Park
2007/0115812 A1 5/2007 Hughes
2007/0136801 A1 6/2007 Le et al.
2007/0150720 A1 6/2007 Oh
2007/0160198 A1 7/2007 Orsini et al.
2007/0189517 A1 8/2007 Koseki et al.
2007/0192596 A1 8/2007 Otsuka
2007/0195951 A1 * 8/2007 Leung, Jr. ............. H04L 9/0618 380/37
2007/0195960 A1 8/2007 Goldman
2007/0204159 A1 8/2007 Hara
2007/0237327 A1 10/2007 Taylor
2007/0245141 A1 10/2007 O'Keeffe
2007/0245413 A1 10/2007 Andolina
2007/0250921 A1 10/2007 LiVecchi
2007/0258586 A1 11/2007 Huang et al.
2008/0002724 A1 1/2008 Grewal
2008/0005569 A1 1/2008 Watson et al.
2008/0010233 A1 1/2008 Sack
2008/0013733 A1 1/2008 Johansson
2008/0022136 A1 1/2008 Mattson
2008/0037777 A1 2/2008 Ignatius et al.
2008/0052533 A1 2/2008 Iida et al.
2008/0052765 A1 2/2008 Shinomiya et al.
2008/0062803 A1 3/2008 Fronte et al.
2008/0072035 A1 3/2008 Johnson
2008/0091945 A1 4/2008 Princen et al.
2008/0098226 A1 4/2008 Zokumasui
2008/0130889 A1 6/2008 Qj
2008/0130894 A1 6/2008 Qj
2008/0141023 A1 6/2008 Qi
2008/0151893 A1 6/2008 Nordmark et al.
2008/0168135 A1 7/2008 Redlich et al.
2008/0181406 A1 7/2008 Iyer et al.
2008/0183992 A1 7/2008 Martin et al.
2008/0226082 A1 9/2008 Brunet et al.
2008/0288782 A1 11/2008 Iyer
2009/0013175 A1 1/2009 Pedersen
2009/0019527 A1 1/2009 Winslow
2009/0034734 A1 2/2009 Owens et al.
2009/0043901 A1 2/2009 Mizikovsky et al.
2009/0046858 A1 2/2009 Iyer et al.
2009/0097661 A1 4/2009 Orsini et al.
2009/0129388 A1 5/2009 Akhtar et al.
2009/0177894 A1 7/2009 Orsini et al.
2009/0178144 A1 7/2009 Redlich et al.
2009/0198997 A1 8/2009 Yeap et al.
2009/0228708 A1 9/2009 Trostle
2009/0249084 A1 10/2009 Ogawa
2009/0254572 A1 10/2009 Redlich et al.
2009/0254750 A1 10/2009 Bono et al.
2009/0327617 A1 12/2009 Furuichi et al.
2010/0010968 A1 1/2010 Redlich et al.
2010/0115260 A1 5/2010 Venkatesan et al.
2010/0128874 A1 5/2010 Scott-Nash
2010/0153702 A1 6/2010 Loveless
2010/0153704 A1 6/2010 Winslow
2010/0161981 A1 6/2010 Dodgson et al.
2010/0169645 A1 7/2010 McGrew et al.
2010/0198730 A1 8/2010 Ahmed et al.
2010/0250497 A1 9/2010 Redlich et al.
2010/0254537 A1 10/2010 Buer et al.
2010/0274861 A1 10/2010 Asiedu
2010/0278338 A1 11/2010 Chang et al.
2010/0299313 A1 11/2010 Orsini et al.
2011/0069835 A1 3/2011 Maliszewski et al.
2011/0087889 A1 4/2011 Iyer et al.
2011/0131138 A1 6/2011 Tsuchiya
2011/0153969 A1 6/2011 Petrick
2011/0153985 A1 * 6/2011 Saha ..................... H04L 63/166 712/42
2011/0154019 A1 6/2011 Wang
2011/0154031 A1 6/2011 Banerjee et al.
2011/0167265 A1 7/2011 Ahuja et al.
2011/0202755 A1 8/2011 Orsini et al.
2011/0246766 A1 10/2011 Orsini et al.

(56) References Cited

U.S. PATENT DOCUMENTS

2011/0246785 A1 10/2011 Linsley et al.
2011/0252236 A1 10/2011 De Atley et al.
2011/0252480 A1 10/2011 Patawaran et al.
2011/0264905 A1 10/2011 Ovsiannikov
2011/0274112 A1 11/2011 Czaszar
2011/0283339 A1 11/2011 Smith
2011/0296440 A1 12/2011 Laurich et al.
2011/0311048 A1 12/2011 Nagata et al.
2012/0011351 A1 1/2012 Mundra et al.
2012/0017095 A1 1/2012 Blenkhorn
2012/0066509 A1 3/2012 Lapp et al.
2012/0072723 A1 3/2012 Orsini et al.
2012/0076298 A1* 3/2012 Bolotov ................ H04L 9/0631 380/255
2012/0110316 A1 5/2012 Chamberlain et al.
2012/0124378 A1 5/2012 Chang
2012/0159159 A1 6/2012 Messerges et al.
2012/0159183 A1 6/2012 Adams et al.
2012/0166576 A1 6/2012 Orsini et al.
2012/0166818 A1 6/2012 Orsini et al.
2012/0179916 A1 7/2012 Staker et al.
2012/0198241 A1 8/2012 O'Hare et al.
2012/0204032 A1 8/2012 Wilkins et al.
2012/0210119 A1 8/2012 Baxter et al.
2012/0213360 A1 8/2012 Le Quere
2012/0233472 A1 9/2012 Faraboschi
2012/0246489 A1 9/2012 Brelot
2012/0257506 A1 10/2012 Bazlamacci et al.
2012/0278529 A1 11/2012 Hars
2012/0303826 A1 11/2012 Nelson
2012/0320921 A1 12/2012 Barnes
2012/0324222 A1 12/2012 Massey et al.
2012/0331088 A1 12/2012 O'Hare et al.
2013/0013931 A1 1/2013 O'Hare et al.
2013/0034229 A1 2/2013 Sauerwald
2013/0054979 A1 2/2013 Basmov et al.
2013/0077788 A1 3/2013 Blanchard et al.
2013/0124852 A1 5/2013 Haeger
2013/0219172 A1 8/2013 Johnson
2013/0254542 A1 9/2013 Buer et al.
2013/0268931 A1 10/2013 O'Hare et al.
2013/0305039 A1 11/2013 Gauda
2013/0311780 A1 11/2013 Besehanic
2013/0326220 A1 12/2013 Connelly et al.
2013/0332724 A1 12/2013 Walters
2014/0013123 A1 1/2014 Khazan et al.
2014/0013452 A1 1/2014 Aissi et al.
2014/0068262 A1 3/2014 Robertson et al.
2014/0108782 A1 4/2014 Salinger et al.
2014/0108785 A1 4/2014 Lindteigen et al.
2014/0122866 A1 5/2014 Haeger et al.
2014/0122876 A1 5/2014 Johnson
2014/0122879 A1 5/2014 Johnson
2014/0143533 A1 5/2014 Ganong, III et al.
2014/0143538 A1 5/2014 Lindteigen
2014/0195793 A1 7/2014 Lindteigen
2014/0195798 A1 7/2014 Brugger et al.
2014/0229731 A1 8/2014 O'Hare et al.
2014/0245007 A1 8/2014 Buer et al.
2014/0250300 A1 9/2014 Runkis et al.
2014/0281526 A1 9/2014 Lindteigen
2014/0324698 A1 10/2014 Dolcino et al.
2015/0019443 A1 1/2015 Sheets et al.
2015/0074409 A1 3/2015 Reid et al.
2015/0095645 A1 4/2015 Eldar
2015/0128243 A1 5/2015 Roux et al.
2015/0154418 A1 6/2015 Redberg
2015/0163229 A1 6/2015 Lindteigen
2015/0188893 A1 7/2015 Sood
2015/0222604 A1 8/2015 Ylonen
2015/0256518 A1 9/2015 Buer et al.
2015/0271151 A1 9/2015 Brugger et al.
2015/0363608 A1 12/2015 Redberg
2015/0363611 A1 12/2015 Redberg
2015/0381710 A1 12/2015 Kish
2016/0056956 A1 2/2016 O'Hare
2016/0219024 A1 7/2016 Verzun et al.
2016/0308680 A1 10/2016 Lindteigen
2017/0019377 A1 1/2017 Lindteigen
2017/0061141 A1 3/2017 Redberg
2017/0075821 A1 3/2017 Takahashi
2017/0083725 A1 3/2017 Takahashi
2017/0085372 A1 3/2017 Anderson et al.
2017/0093587 A1 3/2017 Glisson
2017/0098096 A1 4/2017 Redberg
2017/0118180 A1 4/2017 Takahashi
2017/0118214 A1 4/2017 Vainstein
2017/0126623 A1 5/2017 Lindteigen
2017/0149748 A1 5/2017 Lindteigen
2017/0201382 A1 7/2017 Lindteigen
2017/0286669 A1 10/2017 O'Hare et al.
2017/0359317 A1 12/2017 Anderson et al.
2018/0041485 A1 2/2018 O'Hare et al.
2018/0068125 A1 3/2018 Redberg
2018/0082084 A1 3/2018 Takahashi et al.
2018/0139061 A1 5/2018 Glisson
2018/0176194 A1 6/2018 Xiong
2018/0268173 A1 9/2018 Takahashi et al.
2019/0050348 A1 2/2019 Takahashi et al.
2021/0119979 A1 4/2021 Takahashi
2022/0019699 A1 1/2022 Takahashi
2022/0174049 A1 6/2022 Takahashi
2022/0174050 A1 6/2022 Anderson
2022/0198069 A1 6/2022 Takahashi
2023/0049021 A1 2/2023 Takahashi
2024/0064128 A1 2/2024 Takahashi
2024/0098071 A1 3/2024 Anderson et al.
2024/0104250 A1 3/2024 Takahashi

FOREIGN PATENT DOCUMENTS

EP 3350974 7/2018
EP 3613195 2/2020
EP 4481609 A2 12/2024
JP 2005-167816 6/2005
JP 2005284525 A 10/2005
JP 2012-137975 7/2012
JP 2014-176030 9/2014
WO 2017/048896 3/2017
WO 2017/074887 5/2017
WO 2018/231519 12/2018

OTHER PUBLICATIONS

Carbonite White Paper—"The Better Backup Plan, Making Sense of the Cloud"; 5 pages.

Carbonite White Paper—"The Better Backup Plan, Trouble Free Backup Solutions"; 3 pages.

Korean Intellectual Property Office; International Patent Application No. PCT/US2016/058568, International Search Report and Written Opinion, Jan. 20, 2017; 9 pages; Korea.

Korean Intellectual Property Office; International Patent Application No. PCT/US2016/051834, International Search Report and Written Opinion, Dec. 21, 2016; 11 pages; Korea.

McIvor et al. The Institute of Electronics, Communications and Information Technology (ECIT) "High-Radix Systolic Modular Multiplication on Reconfigurable Hardware." 2005. pp. 13-18, 6 pages.

Nedjah, Nadia et al. State University of Rio de Janeiro, Department de Systems of Engineering and Computation. "Systolic Hardware Implementation for the Montgomery Modular Multiplication." 6 pages.

Vasyltsov et al.; Fast Digital TRNG Based on Metastable Ring Oscillator; 17 pages; Samsung Electronics; Korea.

Wikipedia; Hardware Security Module; 6 pages.

The International Bureau of WIPO; PCT International Preliminary Report on Patentability, Issued for PCT/US2016/058568; May 11, 2018; 5 pages; Europe.

The International Bureau of WIPO; PCT International Preliminary Report on Patentability, Issued for PCT/US2016/051834; Mar. 20, 2018; 9 pages; Europe.

(56) References Cited

OTHER PUBLICATIONS

Korean Intellectual Property Office; International Patent Application No. PCT/US2018/035052, International Search Report and Written Opinion, Sep. 11, 2018; 11 pages; Korea.
European Patent Office; Extended European Search Report, issued in connection to EP16847265.2; Feb. 11, 2019; 11 pages; Europe.
Israeli Patent Office; Office Action issued in connection to application No. 258095; Dec. 17, 2019; 5 pages; Israel.
The International Bureau of WIPO; PCT International Preliminary Report on Patentability, issued in connection to PCT/US2018/035052; Dec. 17, 2019; 9 pages; Switzerland.
Australian Government, IP Australia; Examination Report No. 1 for Standard Patent Application, issued in connection to application No. 2016323147; Mar. 25, 2020; 5 pages; Australia.
European Patent Office; Extended European Search Report, issued in connection to EP18816604.5; Mar. 18, 2020; 8 pages; Europe.
Japanese Patent Office; Office Action Summary, issued in connection to application No. 2018-534774; Oct. 6, 2020; 4 pages; Japan.
European Patent Office; Communication Pursuant to Article 94(3) EPC, issued in connection to application No. EP16847265.2; Oct. 12, 2020; 6 pages; Europe.
Menezes, A. et al.; Chapter 7: Block Ciphers ED; Handbook of Applied Cryptography; Oct. 1, 1996; 223-282 pages; CRC Press Series on Discrete Mathematics and its Applications; CRC Press.
Jang-Jaccard et al.; Portable Key Management Service for Cloud Storage; Oct. 2012; IEEE; pp. 147-156.
European Patent Office; Communication Pursuant to Article 94(3) EPC, issued in connection to application No. 18816604.5; Dec. 21, 2021; 6 pages; Europe.
European Patent Office; Summons to Attend Oral Proceedings Pursuant to Rule 115(1) EPC; Feb. 21, 2022; 7 pages; Europe.
Australian Government, IP Australia; Examination Report No. 1 for Standard Patent Application, issued in connection to application No. 2021201714; May 19, 2022; 3 pages; Australia.
Canadian Intellectual Property Office; Examiner's Report, issued in connection to application No. 2997125; Dec. 29, 2022; 4 pages; Canada.
European Patent Office; Communication pursuant to Article 94(3) EPC, issued in connection to application No. 18816604.5; Feb. 22, 2023; 6 pages; Europe.
Japanese Patent Office; Office Action Summary, issued in connection to application No. 2021-176856; Nov. 8, 2022; 6 pages; Japan.
Eguro, Ken; FPGAS for trusted cloud computing; 2012; IEEE; pp. 63-70.
Canadian Intellectual Property Office; Examiner's Report, issued in connection to application No. 2997125; Nov. 8, 2023; 4 pages; Canada.
Canadian Intellectual Property Office; Office Action, issued in connection to application No. 3066728; Nov. 29, 2024; 3 pages; Canada.
Japan Patent Office; Notice of Reasons for Refusal, issued in connection to application No. 2023-091525; 11 pages; Aug. 27, 2024; Japan.

* cited by examiner

FPGA 502
FPGA
FPGA
FPGA 502
FPGA 502
FPGA
FPGA 502
FPGA
FPGA

SECURITY DEVICE WITH PROGRAMMABLE SYSTOLIC-MATRIX CRYPTOGRAPHIC MODULE AND PROGRAMMABLE INPUT/OUTPUT INTERFACE

REFERENCE TO RELATED APPLICATIONS

This is a continuation application of U.S. Non-Provisional application Ser. No. 17/691,986, filed Mar. 10, 2022, entitled "SECURITY DEVICE WITH PROGRAMMABLE SYSTOLIC-MATRIX CRYPTOGRAPHIC MODULE AND PROGRAMMABLE INPUT/OUTPUT INTERFACE," by Richard J. Takahashi, which is a continuation of U.S. Non-Provisional application Ser. No. 15/983,982, filed May 18, 2018, entitled "SECURITY DEVICE WITH PROGRAMMABLE SYSTOLIC-MATRIX CRYPTOGRAPHIC MODULE AND PROGRAMMABLE INPUT/OUTPUT INTERFACE," by Richard J. Takahashi, which is a continuation of U.S. Non-Provisional application Ser. No. 15/072,730, filed Mar. 17, 2016, entitled "SECURITY DEVICE WITH PROGRAMMABLE SYSTOLIC-MATRIX CRYPTOGRAPHIC MODULE AND PROGRAMMABLE INPUT/OUTPUT INTERFACE," by Richard J. Takahashi, which is a continuation of U.S. Non-Provisional application Ser. No. 14/177,392, filed Feb. 11, 2014, entitled "SECURITY DEVICE WITH PROGRAMMABLE SYSTOLIC-MATRIX CRYPTOGRAPHIC MODULE AND PROGRAMMABLE INPUT/OUTPUT INTERFACE," by Richard J. Takahashi, which itself claims priority to U.S. Provisional Application Ser. No. 61/806,676, filed Mar. 29, 2013, entitled "PROGRAMMABLE CRYPTO AND PACKET WITH SECURE BOOT," by Richard J. Takahashi, the contents of which applications are incorporated by reference in their entirety as if fully set forth herein.

FIELD OF THE TECHNOLOGY

At least some embodiments disclosed herein relate to security processing in general, and more particularly, but not limited to, security processing of data using programmable cryptographic modules.

BACKGROUND OF THE INVENTION

Today's stored data (e.g., cloud data storage, data storage farms and networks), in general, is unsecure and accessible to unwanted intruders. Current IT network security solutions consist of layering security products to protect a given network. These products typically consist of firewalls, intrusion detection and prevention systems, security analytics, malware software, access controls, etc., and yet daily intrusions remain as an on-going problem.

One problem is that firewalls, intrusion detection systems (IDSs), intrusion prevention systems (IPSs), security analytics, and malware products can only detect "known" attacks. Firewalls, IDS/IPS, and malware products are deterministic search and analytics engines designed find pattern matching, signatures of known attacks, and viruses. Firewalls, IDS/IPS, and malware products are designed to prevent "known" attacks and general access, denial or disruption attacks, for data in transit, but are not designed for securing data at rest (i.e., data stored in large storage area networks (SAN)). They cannot detect or stop new attacks, malware or virus or variants. Etc. Therefore new attacks can be embedded undetected into the network and the data-at-rest storage area. In the world of insider and external attackers, emerging government regulations to protect user information, and growth of cloud computing and storage, there is a need to protect stored data in large-scaled storage systems.

In addition, countries around the world suffer losses with billions of dollars a year being stolen, or copied, because it is difficult to protect stored data. For example, many companies have lost billions of dollars worth of intellectual property, and customer's personal and financial information, in the last year, and spent hundreds of millions of dollars repairing damage from data breaches.

SUMMARY OF THE DESCRIPTION

Systems and methods to provide security processing for incoming data (e.g., packets) via a security device are described herein. Some embodiments are summarized in this section.

In one embodiment, a system includes a plurality of cryptographic modules; a first programmable input/output interface configured to route each of a plurality of incoming packets to one of the cryptographic modules for encryption to provide a plurality of encrypted packets; and a second programmable input/output interface configured to route the encrypted packets to a common internal or external data storage.

In one embodiment, a system includes programmable systolic cryptographic modules for security processing of packets from a data source. A first programmable input/output interface routes each incoming packet to one of the cryptographic modules for encryption processing. A second programmable input/output interface routes the encrypted packets from the one cryptographic module to a common data storage. In one embodiment, the first programmable input/output interface is coupled to an interchangeable physical interface that receives the incoming packets from the data source. In another embodiment, each systolic cryptographic module includes a programmable packet input engine, a programmable cryptographic engine, and a programmable packet output engine, each configured as a systolic-matrix array (e.g., using FPGAs) for security processing of the input and output data packets.

In one embodiment, a method includes receiving, by an interchangeable physical interface, a plurality of incoming packets from a data source; routing, by a first programmable input/output interface coupled to the interchangeable physical interface, the plurality of incoming packets to a first module of a plurality of cryptographic modules; encrypting the incoming packets using the first module to provide a plurality of encrypted packets; and routing, by a second programmable input/output interface, the plurality of encrypted packets to a common data storage.

The disclosure includes methods and apparatuses which perform the above. Other features will be apparent from the accompanying drawings and from the detailed description which follows.

BRIEF DESCRIPTION OF DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
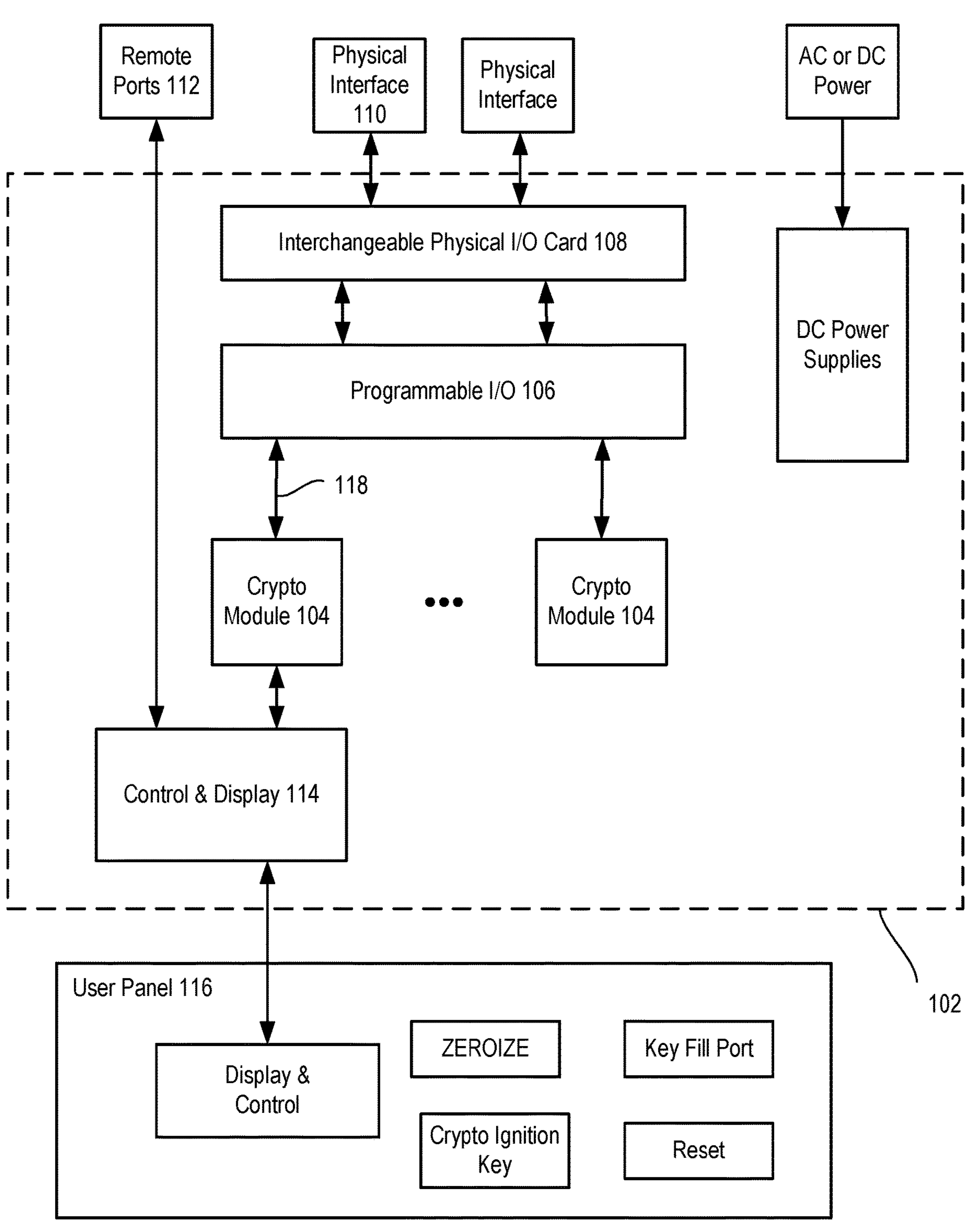
FIG. 1 shows a security processing system including a security device with a plurality of programmable cryptographic modules and a programmable input/output interface, according to one embodiment.

FIG. 1 shows a security processing system including a security device 102 with a plurality of programmable cryptographic modules 104 and a programmable input/output interface 106, according to one embodiment. An interchangeable physical interface 108 is configured to receive a plurality of incoming packets from a data source (e.g., through physical interface 110). In one embodiment, the plurality of cryptographic modules is configured using at least two systolic layers for processing of packets, control data, and keys as discussed further below.

Programmable input/output interface 106 is coupled to the interchangeable physical interface and is configured to route each of the plurality of incoming packets to one of the cryptographic modules 104 for encryption to provide a plurality of encrypted packets. The programmable input/output interface 106 is configured to route the encrypted packets to a common internal or external data storage.

For outgoing packets, programmable input/output interface 106 routes encrypted packets to one of the cryptographic modules 104 for decryption. The decrypted packets are then routed by programmable input/output interface 106 to the data source.

In one embodiment, programmable input/output interface 106 is programmable to support different interface protocols, and each of the plurality of cryptographic modules 104 is programmable to support different encryption protocols (e.g., each module 104 may be programmed to support a different protocol). Programmable input/output interface 106 may include one or more field-programmable gate arrays that are programmable to support the different interface protocols. In one embodiment, programmable input/output interface 106 may be coupled to the cryptographic modules 104 by a high-speed bus such as, for example, a PCI-e bus.

In one embodiment, the interchangeable physical interface 108 is configurable to support two different physical interfaces. In one example, the interchangeable physical interface 108 comprises a replaceable physical input/output panel (or card) that can be replaced independently of the programmable input/output interface 106 and the plurality of cryptographic modules 104.

FIG. 1 also illustrates a control and display unit 114 coupled to control operation of cryptographic modules 104, and also to send or receive data over remote ports 112. Remote ports 112 may be, for example, RS-232, USB, or GigEthernet ports. Remote ports 112 may implement communications using, for example, an SNMP protocol.

Control and display unit 114 provides drivers to a display and status control screen on the user panel 116. User panel 116 also provides soft or hard buttons for user control and data input during the operation of security device 102. Various functions controllable on user panel 116 include a zeroize control (to zeroize the keys), a crypto ignition key (to start the encryption process), a key fill port (to load the keys), and a system reset.

In one embodiment, security device 102 (which may be, e.g., implemented as a security appliance) is used to prevent data breaches by a hacker trying to gain access to encrypted data. In this embodiment, security device 102 provides security, encryption, high-assurance, high-availability sustained bandwidths up to 400 Gbs (full duplex), programmability for data-at-rest and in-network applications. The security device 102 has an interchangeable I/O flexible module as described above to support different physical (PHY) interface connectors and electronics.

In one embodiment, use of the interchangeable I/O interface 108 and programmable I/O interface 106 (implemented using an FPGA I/O systolic array) provides the following advantages:

1) The FPGA I/O systolic array can be programmed for different interfaces and the interchangeable I/O is designed with the selected interface's physical electronics and connectors. This permits the main physical chassis of security device 102 to remain unchanged and to readily use different interface options that can be changed by a user.
2) The security device architecture in conjunction with the interchangeable I/O provides a high-density connectors capability. These flexible I/O design features can be programmed for many different types of interfaces to maximize interfacing flexibility to an end network application.

3) Scalable performance in programmable specified data rate increments for each cryptographic module up to, e.g., six modules which will have up to six times the programmed full duplex data rates. Other lesser or greater numbers of cryptographic modules may be used in other designs.

In one embodiment, flexible I/Os and flexible cryptographic (sometimes simply referred to as "crypto" herein) modules are accomplished by using a scalable systolic architecture and crypto-modules and interchangeable input/output (I/O) card, as described herein. The security device 102 has programmable delay latencies for a specified data block size of programmable bytes sizes. The security device architecture has two programmable elements: the programmable crypto-module and the programmable flexible I/O.

In one embodiment, the flexible I/O has two components: The FPGAs can be programmed to support different interface protocols, and an interchangeable physical I/O card is used to support the physical interfaces and connectors. The flexible I/O also has a switching network. The scalable and programmable crypto-module has a programmable full duplex bandwidth consisting of high performance CPUs and FPGAS clocking up to maximum allowable clock rates internal to the FPGA. This CPU and FPGA in systolic-matrix configuration and implementation provides a fully-programmable system to meet many different applications.

In one embodiment, the security device crypto-module design will be using high performance CPU or equivalent processors and FPGAs forming a programmable systolic scalable module. The programmability efficiencies of design are realized by segmenting functional subsystems from packet engines, crypto engines, key handler and overhead-control management engines. The I/O interface incorporates functional blocks (e.g., 100 Gbs Ethernet, PCI-express, Fibre channel, SAS, Infiniband, SCSI, or any other high speed interface protocols) that are incorporated.

In one embodiment, the security device 102 can be both a media-level encryptor and a file system encryptor. All data payload passing thru security device 102 is encrypted except for the file system headers-commands (which remain in the clear). Therefore, the existing file system will be intact with no drivers required for the end system. The only interface required is for the end system remote management and key management products. This makes the security device transparent to a user or network storage system.

Figure 2:
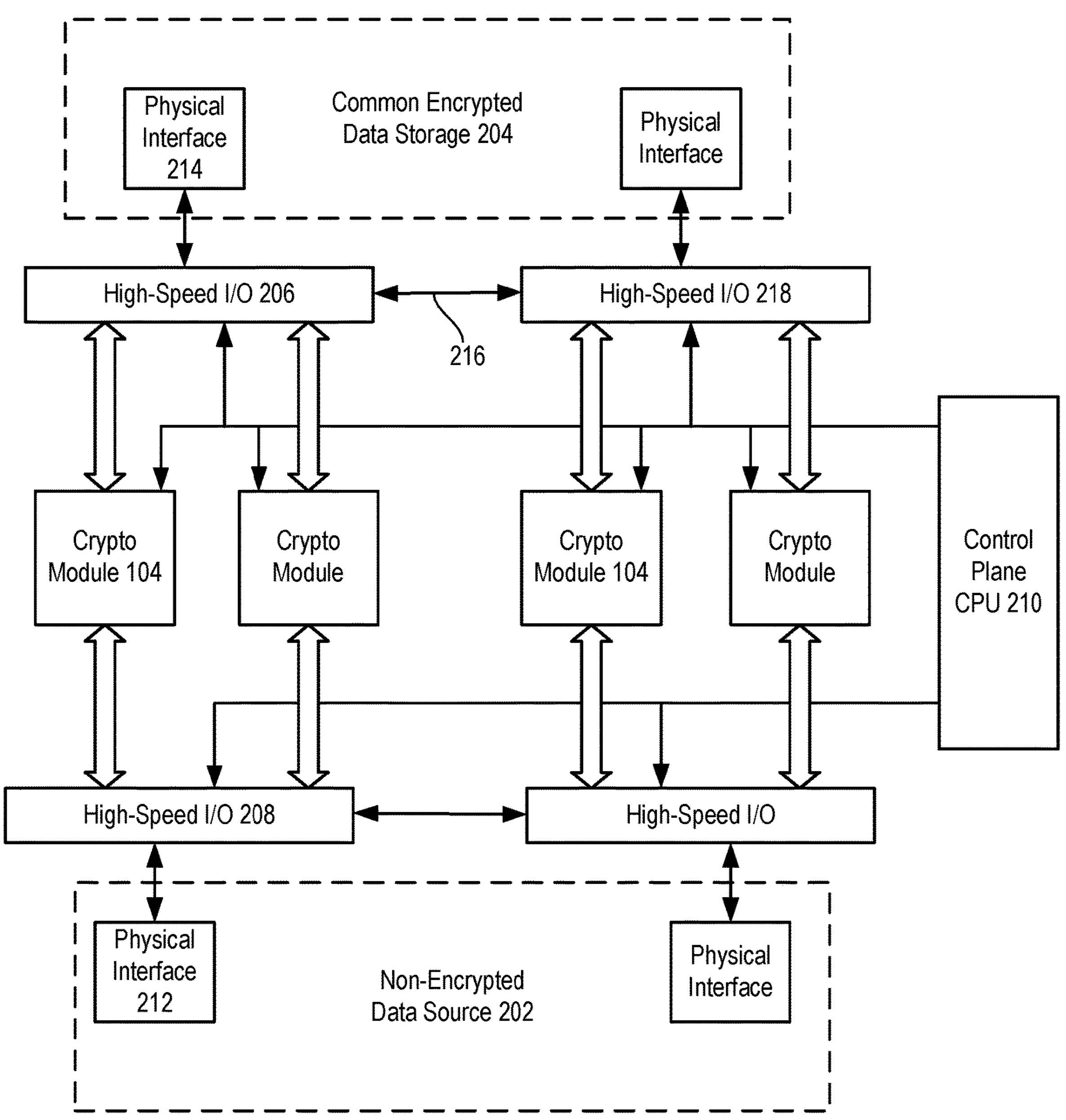
FIG. 2 shows a systolic-matrix security processing system for receiving and encrypting data packets from a non-encrypted data source, and concurrently processing control and data from a control plane for storage in a common encrypted data storage, according to one embodiment.

FIG. 2 shows a security processing system for receiving and encrypting data packets from a non-encrypted data source 202 for storage in a common encrypted data storage 204, according to one embodiment. The system includes cryptographic modules 104. Each cryptographic module is coupled between programmable high-speed input/output (I/O) interfaces 206 and 208, which are each coupled to an interchangeable physical interface (see, e.g., interface 108 in FIG. 1). In one embodiment, interfaces 206 and 218 communicate with each other during security data processing using, for example, a serial bus 216 (e.g., an Interbus serial bus).

Processor 210 handles control plane and data processing for the cryptographic modules 104 and the high-speed input/output interfaces 206, 208, 218. In one embodiment, processor 210 is a control plane processor configured to control systolic data flow for the cryptographic modules 104, and also to control loading of keys from an external key manager to an internal key cache (see, e.g., FIG. 9 below).

Physical interface 212 receives a plurality of incoming packets from data source 202. The first programmable high-speed input/output interface 208 routes each of the plurality of incoming packets to one of the cryptographic modules 104 for encryption processing to provide encrypted packets. The second programmable high-speed programmable input/output interface 206 routes the encrypted packets from the cryptographic module 104 to common encrypted data storage 204 via physical interface 214.

In one embodiment, the routing and switching functions of high-speed interfaces 206 and 208 are provided by programmable input/output interface 106 of FIG. 1. In one embodiment interchangeable physical input/output interface 108 includes physical interface 212 and/or 214.

In one embodiment, each of the encrypted packets has a respective tag to identify an original entry port (e.g., a port of high-speed I/O interface 208), keys or key addresses associated with each of the encrypted packets is decrypted by one of the cryptographic modules to provide corresponding decrypted packets, and the first programmable input/output interface 208 is further configured to use the respective tag to route each decrypted packet back to its original entry port.

In one embodiment, each programmable input/output interface 206, 208, 218 is programmable to support different interface protocols. For example, the first programmable input/output interface 208 may include a plurality of field-programmable gate arrays that are programmable to support the different interface protocols.

In one embodiment, the first programmable input/output interface 208 and the second programmable input/output interface 206 each comprise a switching network and a router (not shown) to route incoming packets (from data source 202 or data storage 204, respectively) to one of the cryptographic modules 104.

In one embodiment, each cryptographic module 104 is designed and programmed, and mathematically optimized for any cryptographic algorithms and network IP protocols. The design can be scaled up to, for example, six or more crypto modules. The security device 102 can be mathematically optimized, for example, for any cryptographic algorithms for full-duplex data rate performance.

In one embodiment, the security device architecture is adaptable to any enterprise class data-at-rest or IP network solution due to the flexible switching I/O architecture. The flexible input and output switching I/O interfaces provide a significant cost advantage and homogeneous data flow and relax the need for data separation. The security device may use FPGAs that bridge to the native I/O interface for the required number of crypto-modules. This allows a single crypto-module to be used with many possible system implementations and configurations based on the end application I/O type and throughput requirements and also be scalable with programmable data rate increments.

In one embodiment, the flexible switch I/O architecture described herein includes programmable I/O modules (using FPGAs) that function as a low latency bridge and switch between the native I/O to the target data-at-rest system and to the internal array of crypto-module processors. A pair of separated, designated programmable FPGA-based I/O interface modules bridges security device 102 to an industry standard network. This scalability and flexibility enables security device 102 to be inserted into existing or new storage network systems supporting scalable data rates.

In one embodiment, the flexible programmable I/O interface is adaptable to any enterprise, or mobile, class data-at-rest interface application. The flexible I/O architecture includes programmable I/O modules (using FPGAs) that function as a low latency bridge between the native I/O of the target data-at-rest system and the internal array of crypto-modules. Flexible I/O programmability is based on FPGA-based modules that can be programmed to any industry standards or a custom interface to the storage system fabric or IP network.

In one embodiment, security device 102 performs at data rates only limited by the technology used. The key-handling agility is matched to the data rates. The internal key management is central to the performance of the cryptographic module in this embodiment.

Figure 3:
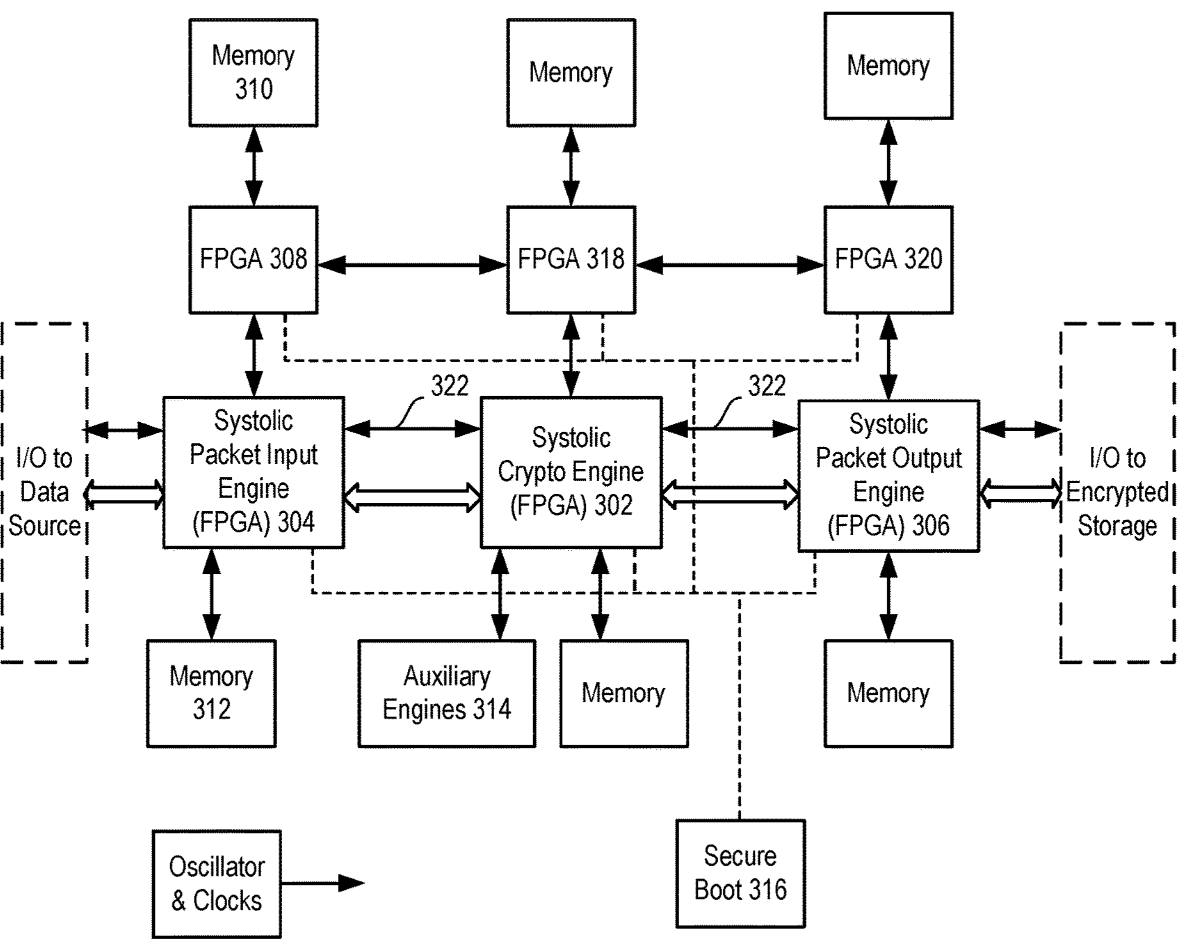
FIG. 3 shows a systolic-matrix cryptographic module including programmable input and output packet engines and a programmable cryptographic processing engine, according to one embodiment.

FIG. 3 shows a cryptographic module 104 including programmable input and output packet engines and a programmable cryptographic processing engine, according to one embodiment. More specifically, cryptographic module 104 comprises a programmable packet input engine 304, a programmable cryptographic engine 302, and a programmable packet output engine 306. In one embodiment, packet engines 304 and 306 are coupled to cryptographic engine 302 using a high-speed serial or parallel bus 322 (e.g., an Interbus bus) for control operations, and using high-speed data busses for data transfer.

In one embodiment, the programmable packet input engine 304, the programmable cryptographic engine 302, and the programmable packet output engine 306 are each configured as a systolic-matrix array and each include one or more field-programmable gate arrays (FPGAs) programmable to support different security protocols. In one example, the programmable packet input engine 304, the programmable cryptographic engine 302, and the programmable packet output engine 306 are each coupled to a respective dedicated program memory for each FPGA (e.g., memory 310 or 312), and to a respective dedicated processor (not shown) to control programming of each FPGA. Each memory 310, 312 may be used, e.g., to provide data, keys buffering and/or storage.

In a method according to one embodiment, the first programmable input/output interface 208 (see FIG. 2) includes a field-programmable gate array (FPGA), and the method includes programming the FPGA to support a different interface protocol than previously used for receiving incoming data packets. In this method, each of the plurality of cryptographic modules 104 includes programmable systolic packet input engine 304, programmable systolic-matrix cryptographic engine 302, and programmable systolic-matrix packet output engine 306. The method further includes programming an FPGA of the packet input engine 304, an FPGA of the cryptographic engine 302, and an FPGA of the packet output engine 306.

In one embodiment, a top systolic layer includes FPGAs 308, 318, and 320, which are coupled to systolic packet engines 304, 306 and cryptographic engine 302, each also including an FPGA, in order to form a two-dimensional systolic-matrix array for data and control processing.

In one embodiment, each crypto module 104 has input and output packet engines and the crypto core. The crypto module has a systolic crypto engine that is tightly coupled to the input and output systolic packet engines. Each element in the crypto module has a dedicated high-performance CPU plus its memory, and dedicated memory to the input-output systolic packet engines and crypto core buffer/storage memory.

In one embodiment, each FPGA(s) array has a dedicated program memory. Also, a compression engine (included, e.g., in auxiliary engines 314) is included for data compression or other data processing required.

In one embodiment, the crypto module of FIG. 3 uses secure boot 316 to verify the FPGA code and that any software (SW) within the crypto module is encrypted-secure and authenticated. During the secure boot process, if any anomalies are detected, the system will not boot and further may provide a user alert that issues have been detected. The secure boot 316 may be designed to work with existing industry key manager systems.

In one embodiment, the crypto module design of FIG. 3 provides features such as hard-wired, one-time programmable options and custom analog/digital circuits for flexible physical partitioning for un-encrypted (plain text) and encrypted (cipher text) separation.

Figures 4, 5:
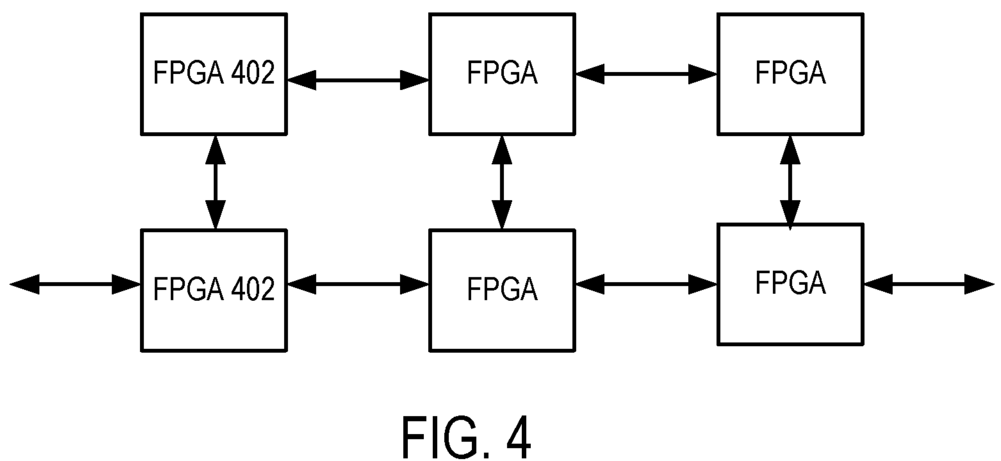
FIGS. 4 and 5 each show an example of a systolic-matrix array with two-dimensional computing paths, according to various embodiments.

FIGS. 4 and 5 each show an example of a systolic-matrix array with two-dimensional computing paths, according to various embodiments. FIG. 4 shows FPGAs 402 organized in a systolic-matrix array for data, keys and control processing of security packets. Although FPGAs are shown forming the systolic-matrix array in FIG. 4, other forms of programmable devices, or other types of data processing units or processors may be used to form the systolic-matrix array in other embodiments (e.g., ASICs may be used). FIG. 5 shows an alternative configuration for systolic-matrix array comprising FPGAs 502 for data control processing of security packets.

In one embodiment, each cryptographic module 104 is implemented using a systolic-matrix array configuration. For example, cryptographic module 104 as illustrated in FIG. 3 is configured in a systolic-matrix array such as the basic form illustrated in FIG. 4. In addition, in one embodiment, the input and output packet engines 304, 306 and/or the cryptographic processing engine 302 for each cryptographic module 104 are also each themselves designed with an internal systolic-matrix array architecture. For example, the cryptographic processing engine 302 may be configured in a systolic-matrix array configuration such as illustrated in FIG. 5. In another example, each packet engine may itself have the systolic array configuration of FIG. 4 or FIG. 5, or yet other systolic array configurations, as part of its internal sub-block processing architecture.

Thus, as described above, in some embodiments, security device 102 is configured with a two or greater multiple-layer systolic-matrix array architecture. In this architecture, each cryptographic module 104 has a systolic-matrix array configuration (i.e., a top systolic array layer), and each of the packet engines and/or cryptographic processing engine has an internal systolic-matrix array configuration (e.g., in a lower systolic array layer formed of FPGAs that is logically underneath the top systolic-matrix array layer). The multiple-layers above combined with two-dimensional systolic arrays provides a three-dimensional systolic-matrix architecture for security device 102.

Figures 6, 7:
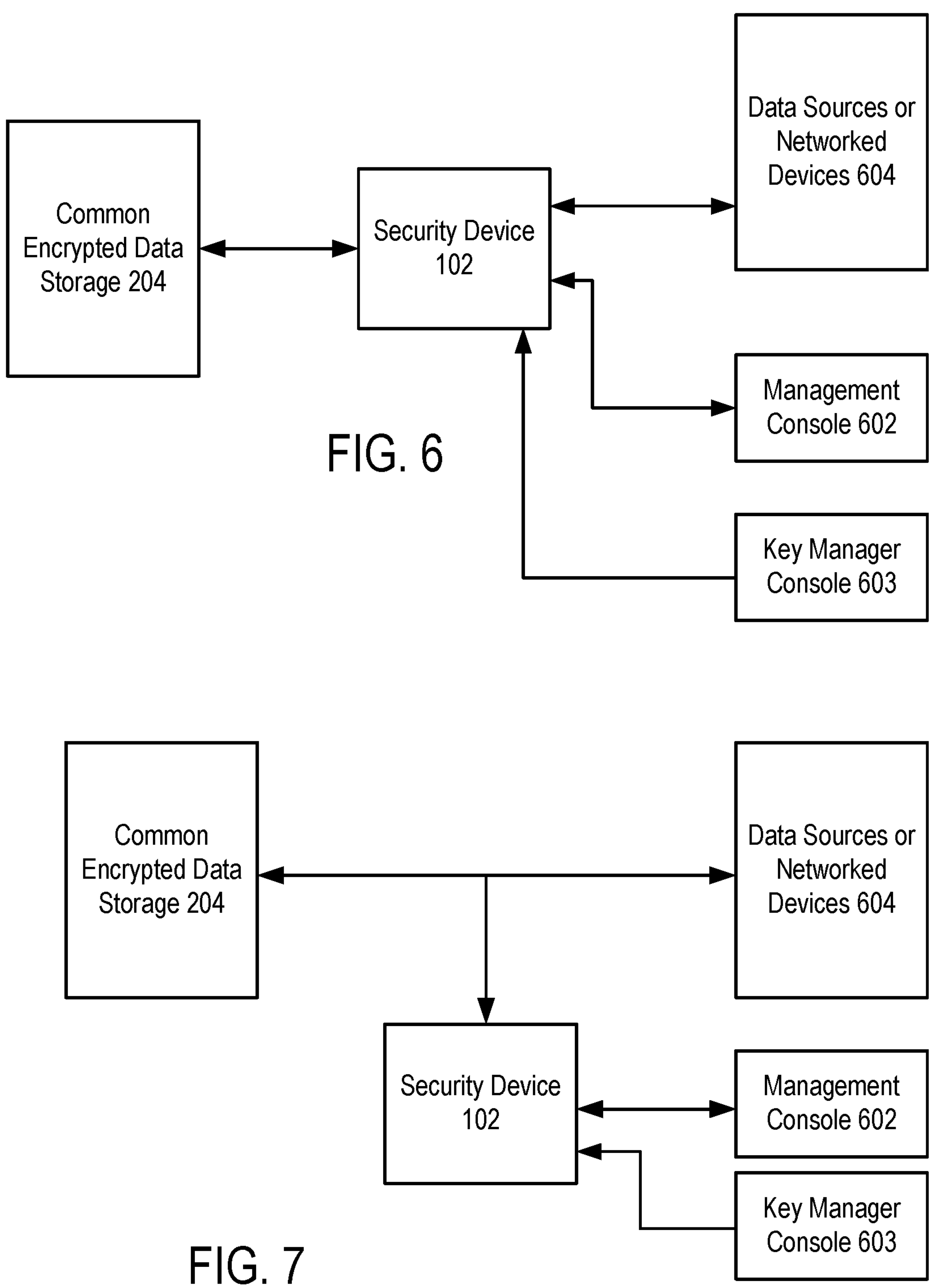
FIG. 6 shows a security device implemented between a data source and encrypted data storage using an in-line configuration, according to one embodiment.
FIG. 7 shows a security device implemented between a data source and encrypted data storage using a side-car configuration, according to one embodiment.

FIG. 6 shows security device 102 implemented between a data source 604 and encrypted data storage 204 using an in-line configuration, according to one embodiment. In one example, security device 102 is installed as an enterprise high-performance data storage encryption and authentication appliance. The security device is installed as in-line (bump in the wire) between the data storage arrays. Security device 102 also interfaces with management console 602 and external key manager console 603.

FIG. 7 shows security device 102 implemented between data source 604 and encrypted data storage 204 using a side-car configuration, according to one embodiment. In one example, security device 102 is installed as a data storage encryption and authentication appliance as side car (off to the side of the data storage). Security device 102 also interfaces with management console 602 and external key manager console 603.

Figure 8:
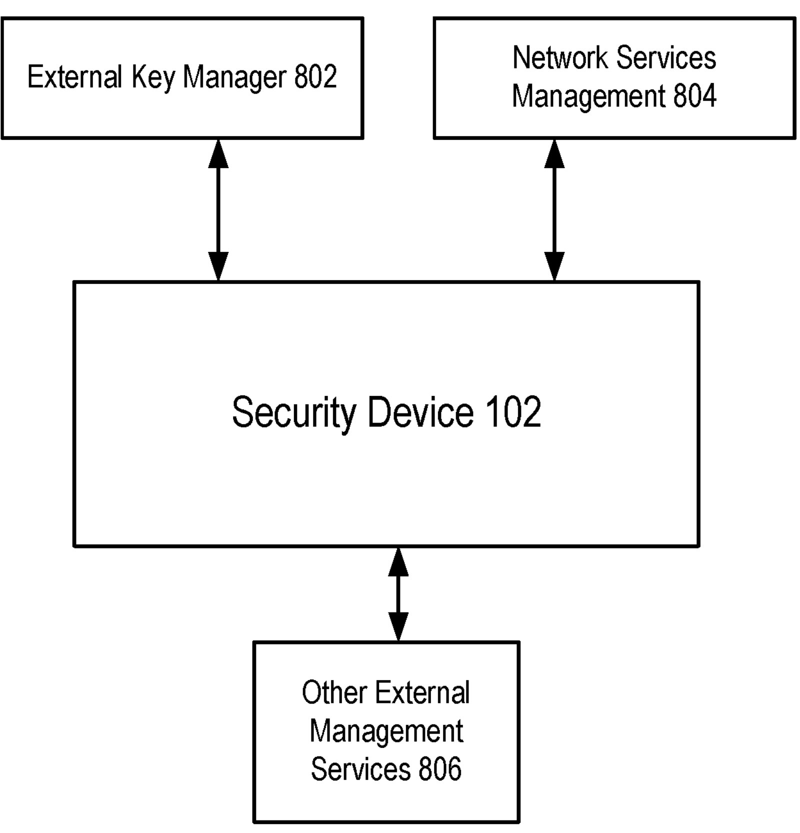
FIG. 8 shows a security device interfacing with external and network services, according to one embodiment.

FIG. 8 shows security device 102 interfacing with external and network services, according to one embodiment. In particular, security device 102 is interfaced with a management console consisting of external key manager 802, network services management 804, and any other required external management services 806.

Figure 9:
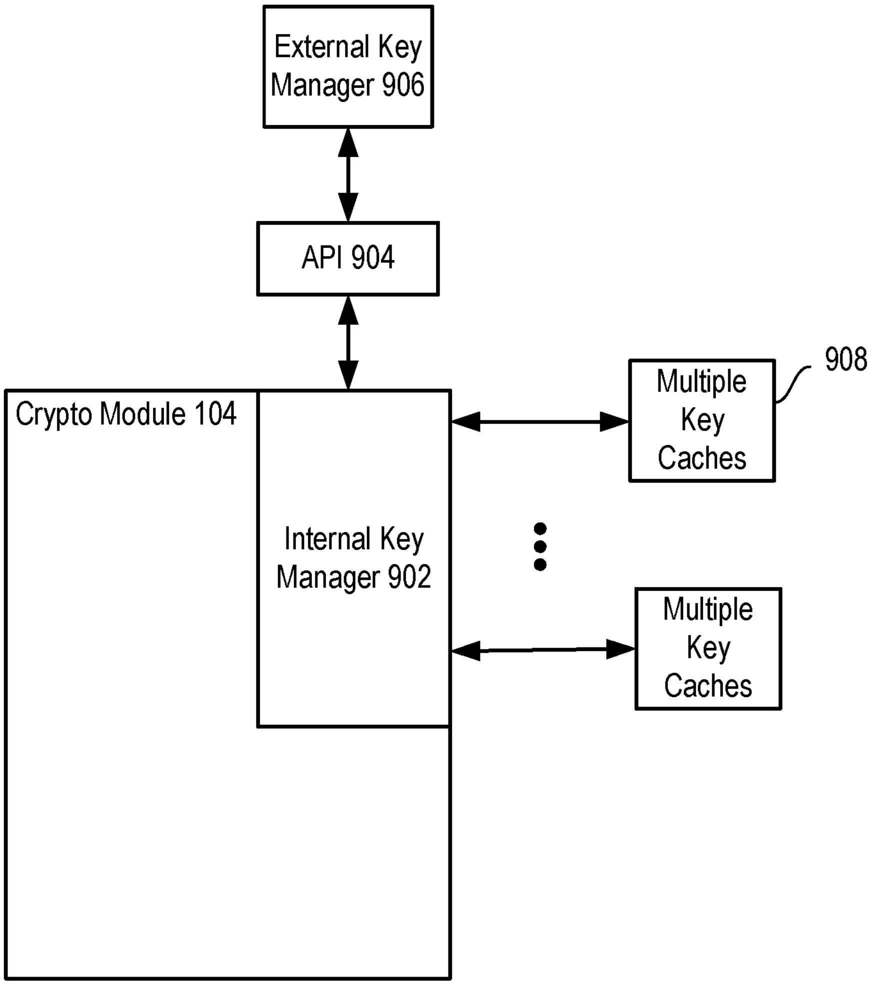
FIG. 9 shows an internal key manager of the cryptographic module that communicates with an external key manager via an application programming interface, according to one embodiment.

FIG. 9 shows an internal key manager 902 of cryptographic module 104 that communicates with an external key manager 906, according to one embodiment. Each of the plurality of cryptographic modules 104 comprises internal key manager 902, which is coupled via an application programming interface (API) 904 to external key manager 906. Keys received via API 904 are stored in one of multiple key caches 908 for use by the cryptographic modules 104 during encryption or decryption of incoming packets. In one embodiment, control plane processor 210 controls loading of the keys from API 904 to one of key caches 908.

In one embodiment, each of the incoming packets to a cryptographic module 104 includes a key tag to identify at least one key associated with the packet to be security processed, and further may also include a source tag to identify a data source and keys for the packet. The internal key manager 902 is configured to retrieve the keys from one of key caches 908 using the key tag for the packet to be processed by the respective cryptographic module 104.

In one embodiment, programmable input/output interface 106, 206, and/or 208 is further configured to route a packet to one of the plurality of cryptographic modules 104 based on the source tag.

In one embodiment, each of the plurality of cryptographic modules 104 may be physically partitioned from the other of the cryptographic modules. In one embodiment, other key features of security device 102 may include the ability to interface or port third party key management software and network management software.

Various additional, non-limiting embodiments of security device 102 are now described below. In one or more embodiments, security device 102 may provide one or more of the following advantages:

1. A fast data rate encryptor at hundreds of gigabits full duplex (e.g., for meeting future optical network data rates).
2. A programmable systolic architecture consisting of FPGAs and CPUs.

The security device is flexible and programmable requiring only software upgrades for different versions and features.

3. Multi-tenancy to secure individual user's data. Each user's data will be encrypted/decrypted using a unique key per the user. In this way, each user's data will be uniquely encrypted/decrypted and stored in a common data storage area. If by operator or machine error the wrong data is accessed and mistakenly sent to another user, the data is still safe since it is not decrypted by the correct user key.
4. A multi-level security architecture to secure different levels of classified data using a single encryptor. Each classification of data will be encrypted/decrypted using a unique key per the data class. In this way, each classification of data will be uniquely encrypted/decrypted and stored in a common storage area. If by operator or machine error the wrong data is accessed and mistakenly sent to another level of classification, the data is still safe since it is not decrypted by the correct user key.
5. A high-speed key agility and storage for millions of keys.
6. A flexible high-density I/O to interface to network equipment at multiple customer (or other source) sites. Also, the flexible I/O can be programmed for mixed interface types (e.g., 10 Gbs Ethernet, Infiniband, or PCI-express), thus requiring no interface bridging network equipment.
7. A replaceable, flexible I/O physical panel that can be customized for a specific network installation without the need to re-design the main chassis of security device 102.
8. A secure boot to protect, authenticate the CPUs, FPGAs firmware and software (SW) codes.

Figure 10:
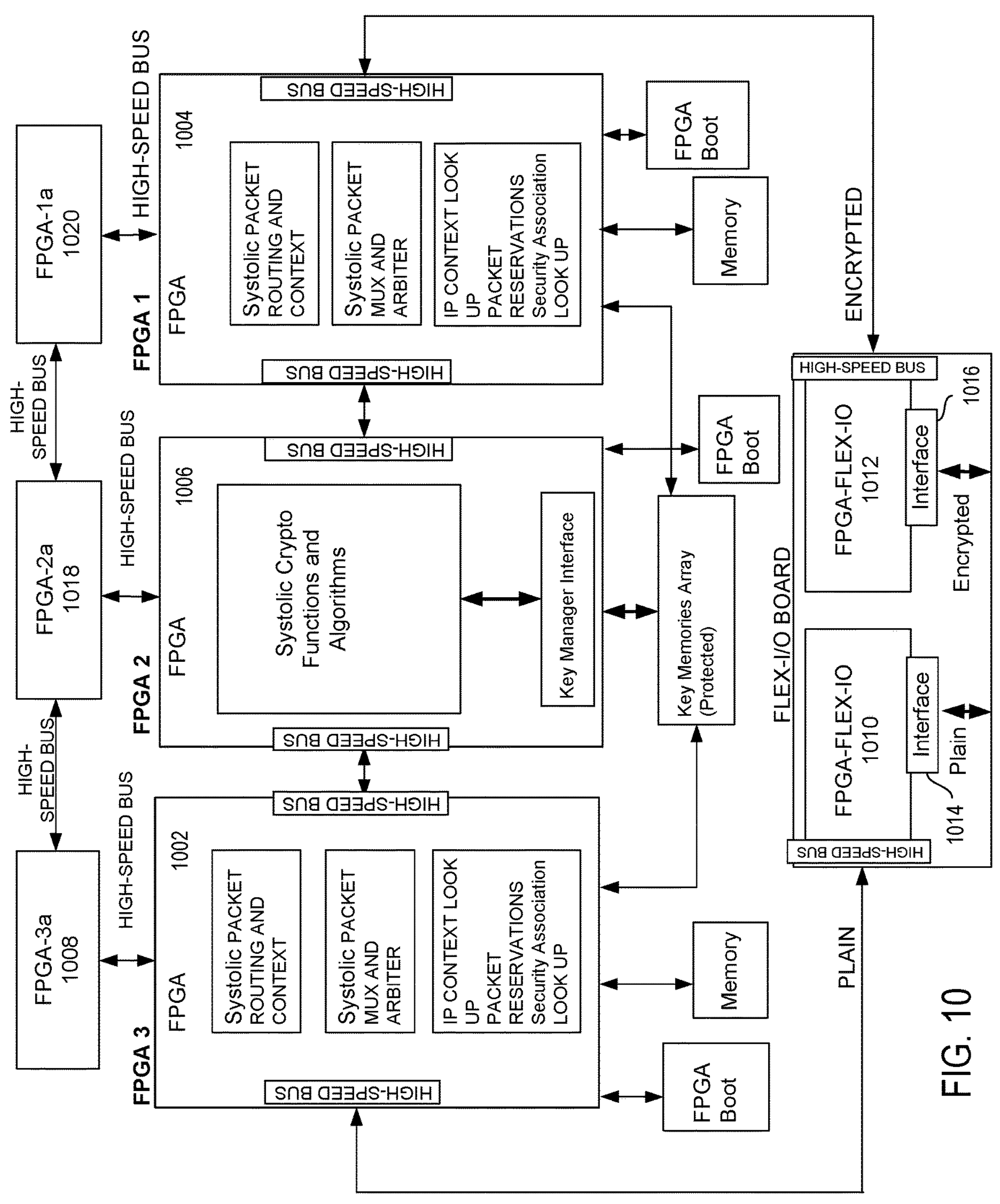
FIG. 10 shows a specific implementation of a programmable cryptographic module configured as a systolic array of FPGAs, according to one embodiment.

FIG. 10 shows a specific implementation of a programmable cryptographic module configured as a systolic-matrix array of FPGAs, according to one embodiment. In particular, the system of FIG. 10 is an exemplary implementation of cryptographic module 104 as was discussed for FIG. 3 above.

Specifically, un-encrypted or plain text data (e.g., incoming data packets) enters physical interface 1014 and is routed by programmable input interface 1010 to packet input engine 1002. Data packets are routed by input engine 1002 to an appropriate cryptographic core in cryptographic processing engine 1006.

A security association (SA) key lookup is used in packet engine 1002 or 1004 to determine appropriate keys for loading from a key memories array to cryptographic engine 1006 via a key manager interface or as defined in the packet header. These keys are used for security processing of the corresponding data packet.

After encryption by processing engine 1006, encrypted packets are provided to packet output engine 1004 for routing to programmable output interface 1012. The encrypted data leaves via physical interface 1016.

Programmable interfaces 1010 and 1012 may be formed using FPGAs or other programmable devices (e.g., as described above for I/O interfaces 106 or 208 of FIGS. 1 and 2). In one embodiment, physical interfaces 1014 and 1016 may form a part of interchangeable physical input/output interface 108. In one embodiment, physical interface 108 is implemented as a removable physical card.

In one embodiment, FPGAs 1008, 1018, and 1020 form a portion of the systolic-matrix array configuration illustrated in FIG. 10 and may be coupled to the packet input and output engines and cryptographic processing engine using serial buses. The packet input and output engines and cryptographic engine are formed using FPGAs to provide a two-dimensional systolic array of a top systolic layer. In one example, data and control processing is performed in two dimensions using the six FPGA units (e.g., FPGA 1008 and packet input engine 1002) as illustrated in FIG. 10.

In one embodiment, the sub-blocks in the packet input engine 1002 or packet output engine 1004 such as packet routing, packet multiplexer, and IP context lookup are implemented in a systolic-matrix array configuration as was discussed above. Data comes into the packet engine, and the packet engine looks at the packets, including the context, and decides where to route each packet. Then, the packet engine determines that a packet requires a particular security association, which is implemented using a key lookup. The packet engine associates the key to the incoming data. The key is read out, and the data is encrypted or decrypted in one of the crypto cores.

In one embodiment, high-speed memory is coupled to the input and output packet engines, and may be any type of high-speed memory in various embodiments.

In one embodiment, all primary processing works in a matrix. Data is constantly flowing in two dimensions. For example, data is flowing horizontally, keys are flowing up vertically, and control information is flowing down vertically as part of the two-dimensional processing.

Variations

Additional variations, details, and examples for various non-limiting embodiments are now discussed below. In a first variation, with reference to FIG. 1, the programmable input/output interface 106 is a router/switch that selects one of the crypto modules 104 to receive forwarded packets. A router and switch are incorporated inside the input/output interface 106. For example, if a first packet comes through a second port, the first packet will be routed to crypto module number six. Crypto module number six will later route the first packet back out through that same second port of original entry.

There may be two components to the programmable I/O interface. On one side, the interface programs the type of I/O that is desired. The other side of the interface is the router/switch. The router/switch multiplexer knows which crypto module 104 is to receive a given packet. Also, the router/switch knows which crypto module is ready for processing of a packet. For example, if crypto module number one is ready for processing, it will flag itself as being ready for processing. For example, there is a semaphore flag or packet header bits used that tells I/O interface 106 which module is ready to process data. Whatever port is used to bring in the data, that data will be processed in one of the crypto modules, and then tagged out back to the same port when later being decrypted and sent out from storage (e.g., the packet is tagged with some identification of the port using a tag). The tag is used to redirect the packet back to the correct port of original entry.

The crypto module has a security association that determines which keys go with which packet. The programmable input/output may allow programming of different applications because of the use of FPGAs. The back end of the router/switch will accommodate the type of input/output to be used. The router/switch will identify the crypto module to be used. When reprogramming the programmable interface 106, a new physical interface needs to be interchanged or installed. The main security device chassis is not changed out—only the I/O portion is being changed.

In one embodiment, remote ports 112 are basically control ports. The protocol for the remote port may typically be a Simple Network Management Protocol (SNMP) protocol or any other management protocols The key fill port is where the keys are filled into the security device. The crypto ignition key ignites the security device.

With reference to FIG. 2, the Interbus serial bus (mentioned above) coordinates the operation of the two input/output interfaces 206, 218. The Interbus handles any protocol issues between the router and the switch functions of these interfaces. The Interbus is used to provide communication between the FPGAs of the systolic array during operation of the security device. In one example, the Interbus helps to coordinate operation as to which crypto module 104 will receive an incoming packet.

Processor 210 manages control plane operation. Processor 210 also configures components when a new security protocol will be used, uses routing tables, sets the configuration, sets up the programmability, and sets up the power-on self-test. Processor 210 also may facilitate key loading. The key fill port on the front of user panel 116 operates under control by processor 210.

With reference to FIG. 3, a secure boot is used to guarantee that the data booted into the FPGAs of the cryptographic module 104 is proper. The secure boot is executed when the unit is turned on or at boot-up. The code is authenticated by the system. The FPGAs are programmed at every boot up of the unit, or any time that the unit is reset. Each crypto module may have its own CPU which controls programming.

With reference to FIG. 8, external key management 802 is a location that the keys may be stored for passing to the security device 102. A network operator loads the keys into the external key management 802. The security device 102 loads the keys into the crypto modules. There is key tagging in the packet headers and inside the crypto module. When a packet comes into the security device 102, the packet is associated with a given key, and the packet contains information used to route the packet. The external key management can load keys in real-time or only a single time. Network services management 804 is remote management which provides control status, setting-up of the security device unit, and sending of the status back to a user. The other external management services 806 could be used to track how many other units are in the field, what the units are doing, whether each unit is running, and what configuration the unit is in.

In one embodiment, data packets include key tags, customer tags, and packet tags. The packet tag tells what type of packet is coming in. The customer tag identifies the company or source of the data. The key tag tells what key goes with what packet. Each tag is looked at by the packet engine to determine how the packet is going to be routed within the crypto module 104.

Now discussing an embodiment regarding flexible physical partitioning, each cryptographic module 104 may be physically isolated by design. So, only a certain packet will go through a module number one and only certain other packets will go through module number two. For example, crypto module number one may only process a certain style of packet. Crypto module number two may only process packets for a particular customer. Thus, it is physically partitioned. For example, customer number one's data is tagged as belonging to customer number one, for sending it to the specific crypto module. The router determines this requirement, and only that particular crypto module can process that customer's packet.

Regarding internal key management in the crypto module's performance, the key manager loads the keys, and further decides how the keys are dispersed within the crypto module based on the tagging of the incoming data packet. Keys are stored in the selectable key cache 908. The key manager decides based on the tagging of the data packet what keys will be associated with the current packet. This provides key agility.

With reference to FIG. 9, API 904 may be programmed to map into any of several different external key managers 906. The use of API 904 thus provides increased flexibility.

Closing

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings may illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that various stages or components could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system comprising:

a plurality of cryptographic modules each configured to process packets and indicate when ready to process new packets by flagging a corresponding readiness indicator, wherein:

the packet processing includes encrypting a packet based on a security key associated with the packet;

a first interface coupled to the plurality of cryptographic modules and configured to receive an incoming packet, associate a first security key with the incoming packet, select a ready one of the plurality of cryptographic modules based on the corresponding readiness indicator, and route the incoming packet to the selected cryptographic module; and a second interface coupling the plurality of cryptographic modules to a data storage.

2. The system of claim 1, wherein each of the plurality of cryptographic modules comprises at least one systolic-matrix array.

3. The system of claim 1, wherein the readiness indicator corresponds to a semaphore flag.

4. The system of claim 3, wherein the first interface selects the ready one of the plurality of cryptographic modules based on the semaphore flag.

5. The system of claim 1, wherein the readiness indicator corresponds to one or more packet header bits.

6. The system of claim 5, wherein the first interface selects the ready one of the plurality of cryptographic modules based on the one or more packet header bits.

7. The system of claim 1, wherein the first interface is further configured to:

receive the incoming packet on a port;

receive an outgoing packet from the selected cryptographic module corresponding to the incoming packet; and route the outgoing packet to the port.

8. The system of claim 7, wherein the incoming packet is tagged to identify the port.

9. The system of claim 7, wherein the outgoing packet is tagged to identify the port.

10. A system comprising:

a plurality of cryptographic modules each configured to process packets, wherein the packet processing includes encrypting a packet based on a security key associated with the packet, and wherein each cryptographic module is configured to execute a secure boot for verifying at least one systolic-matrix array of the cryptographic module; and a first interface coupled to the plurality of cryptographic modules and configured to receive an incoming packet, associate a first security key with the incoming packet, select one of the plurality of cryptographic modules, and route the incoming packet to the selected cryptographic module.

11. The system of claim 10, wherein the secure boot is executed for verifying FPGA code for the at least one systolic-matrix array of the cryptographic module.

12. The system of claim 11, wherein the secure boot includes programming an FPGA of the cryptographic module with the verified FPGA code.

13. The system of claim 10, wherein each cryptographic module comprises a memory, coupled to the systolic-matrix array, for storing data generated during the packet processing.

14. The system of claim 10, wherein in response to detecting an anomaly during the secure boot, an alert is provided to a user.

15. The system of claim 10, wherein the secure boot is executed for verifying software or a processor of the cryptographic module.

16. The system of claim 10, further comprising a key manager coupled to the first interface.

17. A method comprising:

flagging, by a ready cryptographic module of a plurality of cryptographic modules, a readiness indicator to indicate the ready cryptographic module is ready to process new packets;

receiving, by a first interface coupled to the plurality of cryptographic modules, an incoming packet;

selecting, by the first interface and based on the corresponding readiness indicator, the ready cryptographic module for processing the incoming packet;

routing, by the first interface, the incoming packet to the ready cryptographic module;

processing, by the ready cryptographic module, the incoming packet into a processed packet;

sending, by a second interface coupling the plurality of cryptographic modules to a data storage, the processed packet for storage.

18. The method of claim 17, wherein the readiness indicator corresponds to a semaphore flag or one or more packet header bits.

19. The method of claim 17, further comprising:

receiving, by the second interface from the data storage, the processed packet;

processing, by at least one of the plurality of cryptographic modules, the processed packet into an outgoing packet; and sending, by the first interface, the outgoing packet.

20. The method of claim 19, wherein receiving the incoming packet and sending the outgoing packet uses a same port.

* * * * *